(12) United States Patent
Bar et al.

(10) Patent No.: US 7,794,668 B2
(45) Date of Patent: Sep. 14, 2010

(54) REACTION BLOCK FOR PARALLEL SYNTHETIC CHEMISTRY AND VESSEL THEREFOR

(75) Inventors: Roman Bar, Muttenz (CH); Claus Mueller, Hegenheim (FR); Dieter Voegelin, Sissach (CH)

(73) Assignee: Hoffmann-La Roche Inc., Nutley, NJ (US)

( * ) Notice: Subject to any disclaimer, the term of this patent is extended or adjusted under 35 U.S.C. 154(b) by 706 days.

(21) Appl. No.: 11/491,447

(22) Filed: Jul. 21, 2006

(65) Prior Publication Data

US 2006/0263273 A1 Nov. 23, 2006

Related U.S. Application Data

(63) Continuation of application No. 10/235,055, filed on Sep. 5, 2002, now abandoned.

(30) Foreign Application Priority Data

Sep. 7, 2001 (EP) .................................. 01810859

(51) Int. Cl.
*B01L 3/00* (2006.01)
*B01L 99/00* (2006.01)
*B01J 19/00* (2006.01)

(52) U.S. Cl. .................. 422/129; 422/99; 422/101; 422/102; 422/103; 422/104

(58) Field of Classification Search ............. 422/99, 422/102, 104
See application file for complete search history.

(56) References Cited

U.S. PATENT DOCUMENTS

| 4,567,021 | A | | 1/1986 | Sakagami | |
|---|---|---|---|---|---|
| 4,605,536 | A | | 8/1986 | Kuhnert et al. | |
| 5,395,006 | A | * | 3/1995 | Verma | 220/371 |
| 5,746,982 | A | | 5/1998 | Saneii et al. | |
| 5,801,055 | A | * | 9/1998 | Henderson | 435/297.5 |
| 5,972,694 | A | * | 10/1999 | Mathus | 435/288.4 |
| 6,558,632 | B1 | * | 5/2003 | Guller et al. | 422/104 |
| 2002/0172621 | A1 | * | 11/2002 | Barbera-Guillem | 422/100 |
| 2007/0140925 | A1 | * | 6/2007 | Phelps | 422/130 |

FOREIGN PATENT DOCUMENTS

| DE | 11 71 178 B | 5/1964 |
|---|---|---|
| DE | 199 15 811 A1 | 10/2000 |

(Continued)

OTHER PUBLICATIONS

Abstract of Japanese Patent No. 63 056420 (Mar. 11, 1988).

(Continued)

*Primary Examiner*—Jill Warden
*Assistant Examiner*—Dean Kwak
(74) *Attorney, Agent, or Firm*—George W. Johnston; Dennis P. Tramaloni

(57) ABSTRACT

A reaction vessel for use in an apparatus for parallel synthetic chemistry with a reaction chamber space for containing contents of a chemical reaction and a discharge channel for selectively removing liquid contents of the reaction chamber. The invention includes an apparatus for receiving a plurality of the reaction vessels, a method for using the apparatus and a method for forming the vessels.

34 Claims, 5 Drawing Sheets

FOREIGN PATENT DOCUMENTS

| | | |
|---|---|---|
| EP | 347 837 | 12/1989 |
| GB | 1064901 | 4/1967 |
| WO | WO 97/04863 | 2/1997 |
| WO | WO 98/57739 | 12/1998 |

OTHER PUBLICATIONS

Acc. Chem. Res., vol. 29, pp. 114-122, 1996.
Patent Abstracts of Japan, vol. 1999, No. 11, (Sep. 30, 1999).
Shimadzu Corp., JP 11 165063 A, (Jun. 22, 1999).

* cited by examiner

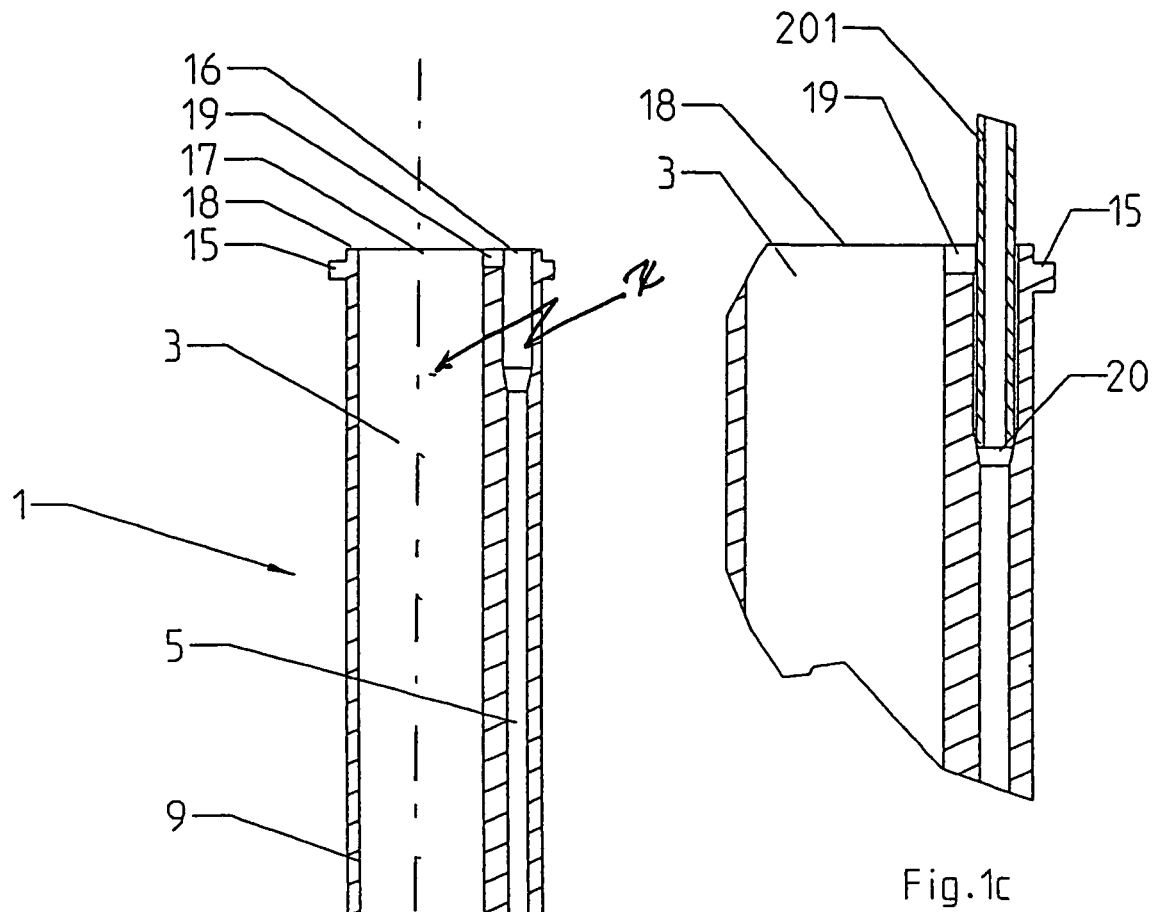
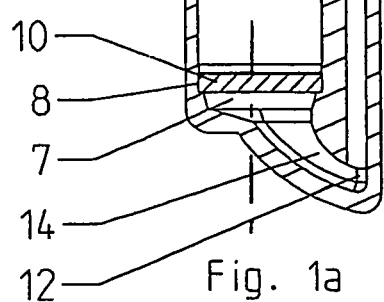
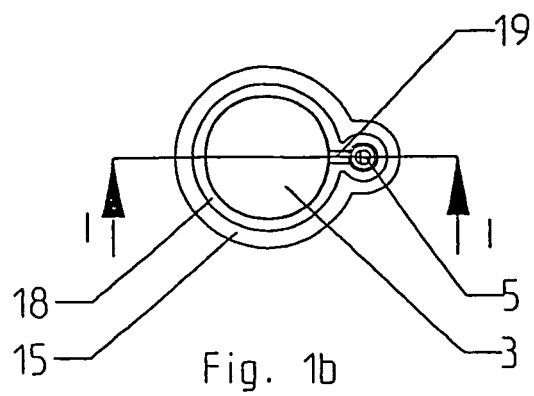

REACTION BLOCK FOR PARALLEL SYNTHETIC CHEMISTRY AND VESSEL THEREFOR

PRIORITY TO RELATED APPLICATIONS

This application is a continuation of U.S. application Ser. No. 10/235,055, filed Sep. 5, 2002, now pending. The entire contents of the above-identified application are hereby incorporated by reference.

FIELD OF THE INVENTION

The present invention relates to a reaction vessel for use in parallel synthetic chemistry and other chemical applications where a multiplicity of chemical reactions is performed in small reaction medium volumes.

The invention further relates to a method for manufacturing such a reaction vessel.

The invention further relates to a reaction block comprising such a reaction vessel.

The invention further relates to a parallel reaction assembly comprising such a reactor block.

BACKGROUND OF THE INVENTION

Combinatorial chemical synthesis requires simultaneously performing a plurality of chemical reactions. Often the problem of separating and characterizing the reaction products has to be solved. Reactor vessel arrays have been developed, wherein one specific reaction or sequence of reactions is performed on one or possibly a small number of adducts in each vessel, so that one or a small number of products are obtained, which may more easily be separated or examined. This type of synthesis is named "parallel synthetic chemistry" due to the relatively large number of reactions performed in parallel.

In order to obtain a high performance, synthesizers enabling performing chemical synthesis in solution, on solid phase supports or in so-called "tea-bags" etc. are required. A known type of synthesizer is characterized by the following features:

a dispensing system using one or more dispensing needles (these liquid handling systems were originally used for biological screening or diagnostic techniques);

a reactor block comprising a number of reactor vessels which allow performing a plurality of chemical reactions at varying temperatures, with shaking and under inert gas; and a computer running a specialized software package which allows the programming and control of the individual synthesis steps.

Most known reactor blocks comprise a plurality of small reactor vessels which each have a top opening closed by a piercable closure, contain an inert gas atmosphere and are accessible through the closure using a needle. Liquids are added and removed through one and the same access. Less often reactor vessels are used which allow liquid transfer through the bottom of the reactor vessel using additional valves. Hence, the known reactor vessels are characterized either by a rather complicated access or a complex structure making them expensive.

SUMMARY OF THE INVENTION

An object of the present invention is to provide a reaction vessel which is more efficiently manufactured and is thus less expensive.

A further object of the invention is to provide a reaction vessel which allows a more convenient exchange of the vessel's contents.

Another object of the invention is to provide a reaction block, which can be used more conveniently than existing systems, particularly within an automated system, and is adapted for receiving a reactor vessel array.

According to one aspect of the invention a reaction vessel that satisfies at least one of the stated objects comprises a body made of a material, particularly a thermoplastic polymeric material, formable an injection molding process, said body comprising a reaction chamber defining a longitudinal axis, having a space therein for receiving a reaction medium and a discharge channel, said reaction chamber and said discharge channel each having an open end and a bottom portion, and a fluidic connection channel that connects the discharge channel with the space within the reaction chamber, the reaction chamber and the discharge channel each extending from its open end towards its bottom portion with constant or decreasing cross section, so that the reaction chamber and the discharge channel may be formed in an injection mold by cores which can be retracted through the respective open ends.

A reaction vessel according to the invention is formed from a polymeric material and is preferably formed by injection molding. The vessel provides a reaction space with an exit connected to a discharge channel. By application of reduced pressure to the discharge channel to a level below ambient pressure, the content of the reaction space, particularly a liquid, is discharged through the discharge channel.

Preferably, the exit of the reaction space to the discharge channel is closed by a filtration material so that the withdrawn content is filtered as it is withdrawn. In this configuration, it is possible to use e.g. loose beads of a solid substrate, e.g. a resin, whereon the reactive component is immobilized.

Another aspect of the invention is a method for manufacturing a reaction vessel that comprises forming said body of said vessel in an injection molding device by injection molding a thermoplastic polymeric material in a mold, the interior of said discharge channel being shaped by a first core and the interior space of the reaction chamber being shaped by a second core, moving said first and second core being into the mold before injection of molten thermoplastic material and retracting said cores during opening of the mold after allowing a sufficient time for the molten material to harden, said second core which shapes the reaction chamber space bearing a movable extension at the end thereof which forms the bottom of the reaction chamber, and said extension touching the first core which shapes the discharge channel when said first and second core are moved into the mold, thereby forming said connection channel between said reaction chamber space and said discharge channel.

Yet another aspect of the invention is a reactor block for performing a multiplicity of chemical reactions simultaneously, particularly for use in parallel synthetic chemistry, that comprises at least two rows of at least two locations for receiving reaction vessels, the reaction vessels having each at least an inlet and an outlet orifice and being preferably reaction vessels according to the present invention as described herein, wherein the reactor block comprises first closure means having openings therethrough and surface parts including pins each being movable in a sliding manner over the inlets and outlets of a number, preferably a row, of reaction vessels situated in the locations into between at least one opening position, where the openings in the allow access to the inlets and/or outlets, and a closed position wherein the inlets and outlets are closed by said surface parts of the first closure means resting on the inlets and outlets.

A further aspect of the invention is a parallel reaction assembly that comprises a reactor block and reaction vessels according to the invention.

The reaction block according to the invention has been specifically designed to facilitate automation and ease of use. In this context, the closing mechanism has been realized by a movable closure means that is guided by guiding means of the block. The closure means extends over a subset of the vessels contained in the block, e.g. preferably one row, and comprises means for enabling access to the openings of the reaction vessels and for closing them, e.g. openings in the closure means alignable with the openings of the reaction vessel and sealing surfaces for closing the reaction vessels.

Furthermore, the guiding means comprise redirecting means, like gates (grooves) or a lever mechanism interacting with corresponding means provided at the closure means. The redirecting means convert a substantially linear movement of the closure means at least near the closing end position in a movement towards the openings of the reaction vessels in order to close them. Preferably, the closure means is further urged against the openings to substantially seal the opening even if a pressure greater than ambient develops in the vessels.

BRIEF DESCRIPTION OF THE DRAWINGS

The subject invention will now be described in terms of its preferred embodiments with reference to the accompanying drawings. These embodiments are set forth to aid the understanding of the invention, but are not to be construed as limiting.

FIG. 1a shows a cross-sectional view of a reactor vessel along line I-I in FIG. 1b;

FIG. 1b shows a top view of a reactor vessel;

FIG. 1c shows an enlarged partial cut along line I-I in FIG. 1b, also showing a withdrawal needle tip;

DETAILED DESCRIPTION OF PREFERRED EMBODIMENTS

Reaction Vessel

Figure 2:
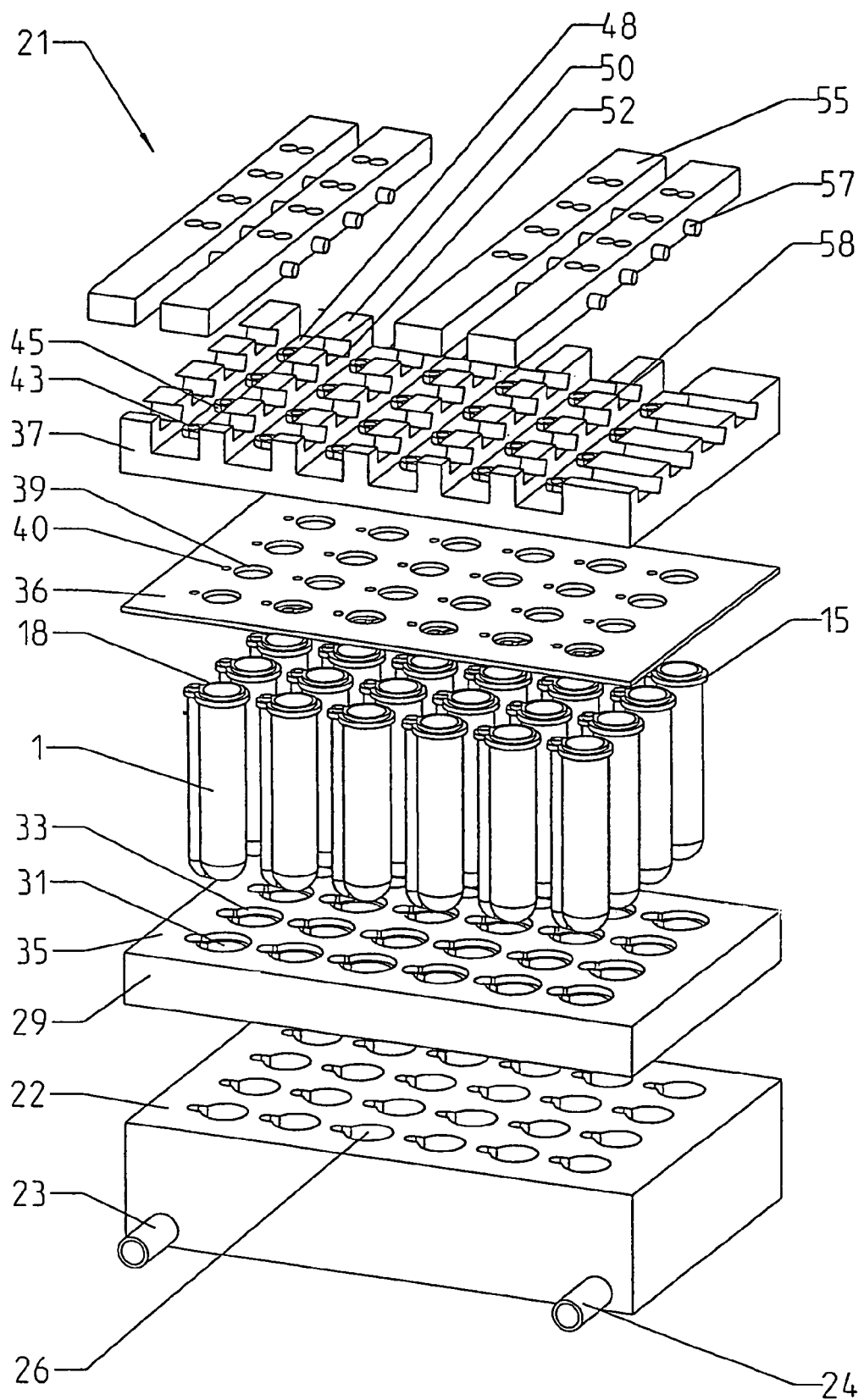
FIG. 2 shows a view perspective exploded view of a reactor block.

FIG. 1a shows a longitudinal section through a reaction vessel 1, FIG. 1b a top view on it. The body of vessel 1 is preferably formed from a thermoplastic material, e.g. a polymeric material which is shapable by injection molding and which is substantially inert under the conditions of the intended reactions. Preferred vessel body materials are polypropylene or a fluorinated polymer like e.g. a poly-co-ethylene-tetrafluoroethylene, particularly the one marketed under the trade name TEFZEL (DuPont).

The body of vessel 1 comprises a reaction chamber space 3 and a discharge channel 5. Discharge channel 5 has an exit opening 16 and a bottom portion. Reaction chamber 3 has an upper opening 17 and a bottom portion. Upper opening 17 of reaction chamber 3 and exit opening 16 of discharge channel 5 are located at the upper rim 18 of reaction vessel 1.

As shown by FIG. 1a, discharge channel 5 is arranged preferably parallel or substantially parallel to a longitudinal axis X of reaction chamber space 3, and a connection channel part 14 fluidly connects discharge channel 5 with within reaction chamber space 3 where a reaction medium is received. Reaction medium contained in reaction chamber space 3 can thus be withdrawn through channel part 14 into discharge channel 5. Channel part 14 has a first orifice 7 located near to or at the bottom of reaction chamber space 3, a second orifice located at the lower end of discharge channel 5, and a bent, tapered shape with the narrow end at the lower end 12 of discharge channel 5.

In a preferred embodiment shown by FIG. 1a, discharge channel 5 substantially extends within and along a lateral wall 9 of reaction chamber space 3. In another embodiment (not represented in the drawings) discharge channel 5 substantially extends on the outer surface of and along a lateral wall of reaction chamber space 3.

A seat 8 is provided in the wall 9 of reaction vessel 1 at the level of orifice 7 of connection channel part 14. A filtration material 10 is placed in seat 8. Filtration material 10 constitutes the bottom wall of the reaction chamber 3 and serves as a filter during discharging of the reaction chamber 3. Filtration material 10 thus constitutes a delimitation of reaction chamber 3 and preferably a delimitation of the bottom of reaction chamber space 3. Filtration material 10 may be a chemically inert fiberous filtration material, a porous fused metallic, polymeric, glass or ceramic matrix. Preferably, filtration material 10 is formed from a porous fused ceramic or glass matrix, i.e., a fritted filter.

Reaction vessel 1 has a collar 15 near its upper rim 18. Collar 15 serves as an abutment when vessel 1 is inserted in a reaction block as described hereinafter.

Inlet opening 17 of reaction chamber space 3 and exit opening 16 of discharge channel 5 are interconnected by a channel or groove 19, which substantially equalizes any pressure difference between reaction chamber space 3 and discharge channel 5 of reaction vessel 1.

When a suction device, preferably a needle 201, is introduced through exit opening 16 of discharge channel 5 and positioned as shown by FIG. 1c for withdrawing the liquid contents of reaction vessel 1 through discharge channel 5, the tip of needle 201 is in sealing contact with a tapering portion 20 of the discharge channel 5. Thereby, channel 19 is fluidically disconnected from discharge channel 5, and by applying a sufficient pressure less than ambient pressure in space 3, to discharge channel through needle 201, the reaction vessel contents can be withdrawn.

Reaction vessel 1 may be conveniently manufactured by injection molding. Reaction chamber space 3 and connection channel 14 are preferably shaped by a core with a hingedly attached extension for the connection 14. The vertical part of discharge channel 5 is preferably shaped by a second core. In the closed state of the injection molding tool, the cores are inserted within the mold cavity, the hingedly attached extension abutting on the end of the second core whereby the mold part for the hollow interior of the discharge conduit is constituted.

After injection of the molten polymeric material and allowance of sufficient time for the molten material to solidify, the cores are withdrawn. For this purpose, the extension of the first core makes a rotational movement on its hinge. The removal is facilitated by the preferred significantly tapered shape of the connection channel 14. For even better removal of the cores, the walls of reaction chamber space 3 and/or the discharge channel 5 are preferably slightly tapered so that their cross sections decrease from their upper opening 17 respectively exit opening 16 towards their respective bottom portions. The taper of the walls of the reaction chamber space can be so small that its cross-section can be considered to be substantially constant along the length of the reaction chamber space. This configuration of reaction chamber space 3 and discharge channel makes possible to retract the above mentioned first and second molding cores through upper opening 17 and exit opening 16 respectively.

As molds of the above-mentioned kind, even including the mentioned cores, are known to persons skilled in the art, a detailed description of such molds with reference to figures is deemed unnecessary and, therefore, not included in the present specification.

From what is explained above, it is evident that reaction vessel 1 is suitable for being efficiently manufactured in large numbers at a low price.

With regard to a preferred use of reaction vessel 1, another advantage consists in that when a reaction is terminated, the liquid contents of reaction chamber 3 can be withdrawn through filtration material 10 and discharge channel 5 by applying the suction device to exit opening 16. In the solid-liquid reaction arrangement most often used in combinatorial chemistry, the reaction partners are immobilized on a solid support material that is retained in the reaction chamber space 3 as a "filter cake" on filtration material 10.

In case that filtration material 10 is occluded, it is usually possible to inject an inert gas, e.g. argon, in the reverse direction (opposite to flow direction when contents of reaction chamber is withdrawn through filtration material 10, connection channel 14 and discharge channel 5) through filtration material 10 for restoring the permeability of filtration material 10. The above mentioned injection of inert gas may also be used for agitating the contents of the reaction chamber and providing a substantially inert atmosphere for conducting the reaction.

Experiments have shown that the above described structure of reaction vessel 1 may withstand a moderate pressure gradient above ambient. Reaction vessel 1 thus allows a reaction to be conducted even under moderate overpressure without a venting provision, e.g. to work at an elevated temperature with respect to the temperature during filling.

In a preferred use of reaction vessel 1, the above-mentioned moderate pressure above ambient is generated by closing the vessel and increasing the temperature.

Typical dimensions of the reaction vessel 1 are:

| | | |
|---|---|---|
| Cross-sectional area of the reaction chamber: | preferably | 10 to 1000 mm$^2$ 75 to 120 mm$^2$ |
| Length of reaction chamber: | preferably | at least 10 mm 20 to 200 mm |
| Cross-sectional area of the discharge channel: | preferably | at least 0.8 mm$^2$ 0.8 to 25 mm$^2$ |

Generally, the cross-sectional area of discharge channel 5 is significantly smaller than the cross-sectional area of reaction chamber space 3.

As can be recognized from the above-description, reaction vessel 1 shown by FIGS. 1a-1c may be conveniently manufactured by injection molding as an integrally manufactured single-piece element, with exception of filtration material 10 being inserted therein after vessel 1 is formed.

Method for Manufacturing the Reaction Vessel

A method for manufacturing the above-described reaction vessel 1 comprises forming the body of vessel 1 by an injection molding process of a theromoplastic polymeric material in a molding tool, whereby
the interior of discharge channel 5 being formed by a first core and the interior of reaction chamber space 3 being formed by a second core,
the first and second cores being moved into the mold before injecting of molten polymeric material and being retracted after allowing sufficient time for the molten polymer material to harden, during opening of the mold,
said second core which shapes the reaction chamber space having a movable extension at the end thereof for forming the bottom of the reaction chamber, and said extension touching the first core thereby forming the discharge channel when said first and second core are disposed the mold in order to form the connection channel between the reaction chamber and the discharge channel.

Reactor Block

Figure 4:
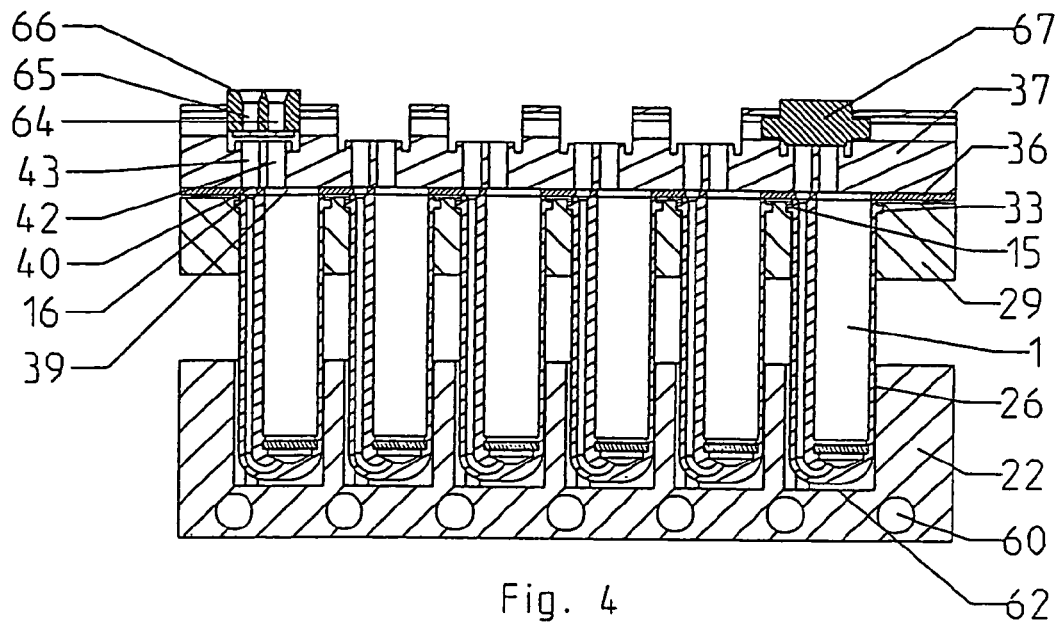
FIG. 4 shows a cross-sectional view along line A-A in FIG. 3.

FIG. 2 shows an exploded view of a reactor block 21 containing 24 reaction vessels 1. Reactor block 21 consists of a base 22 with an integrated conduit (connectors 23 and 24) for temperature control. Base 22 comprises receiving sites 26 each adapted for receiving a reaction vessel 1. Heat is exchanged by air between the reaction vessels 1 and the walls of receiving sites 26. For an efficient thermal contact, the sites 26 are shaped closely similar to the exterior surface of the vessels 1. As shown by FIG. 4, heat exchange (normally heating) is however substantially restricted to the lower part of the reaction vessels 1 in order that vaporized liquid may condense in the cooler upper part of the reaction vessels and flow back into the reaction volume proper located above filtration material 10 (reflux condensation).

A vessel holder 29 is arranged above the base 22 and held by an appropriate, adjustable means (not shown) so that the vessels extend into the base 22 without touching the bottom of their receiving sites 26 in order to compensate for thermal expansion and manufacturing tolerances.

Vessel holder 29 comprises an array of at least two rows of at least two locations 31 for reaction vessels. Each of locations 31 has a circumferential shoulder or depression 33 for receiving the collar 15 of a reaction vessel 1. The upper rims 18 of reaction vessels 1 preferably project slightly above the upper surface 35 of vessel holder 29. Being arranged outside of the reaction chamber's wall, due to the relative position of the discharge channel 5 with respect to the reaction chamber 3 of each vessel, discharge channel 5 also serves as positioning means which allow insertion of the reaction vessels 1 in only one orientation so that the upper openings 17 of the reaction chambers 3 and the exit openings 16 of the discharge channels 5 are always in the same predetermined position. This is important for the use of reactor block 21 with automated handlers, e.g. synthesizers or analyzers.

A sealing foil or plate 36 and a slider gate plate 37 are placed on top of the vessels 1, the slider gate plate 37 being firmly pressed against the holder 29 so that preferably a gas-tight sealing, or at least a fluid-tight sealing between the seal 36, the rim 18 of the vessels 1 and the slider gate plate 37 is obtained. Slider gate plate 37 has guiding slots 48.

The seal 36 and the slider gate plate 37 each provide corresponding holes for each vessel, namely a first hole 39 respectively, a second 42 hole corresponding to upper opening 17 of reaction chamber 3 and a third hole 40 respectively, a fourth hole 43 corresponding to the exit opening 16 of discharge channel 5. The upper ends of holes 42, 43 in the slider gate plate 37 are surrounded by a collar 45 whose upper rim serves as a sealing surface as will be explained below. Another advantageous effect of collar 45 is that it prevents that any spoiled matter in slot 48 from flowing into the open reaction vessels.

The reaction vessels 1 are preferably arranged in six rows of 4 vessels each (corresponding to a standard 24-well plate). Slider gate plate 37 has a slider guiding slot 48 for each row of vessels 1. The walls 50 of the slots 48 contain gates 52, i.e. guiding grooves or channels for closure sliders 55 (four of six necessary sliders 55 are shown).

Closure sliders 55 preferably have a shape that allows them to slide freely within the guiding slots 48. Their lateral faces comprise pins 57 which are adapted to be slidably registered in the gates 52. For assembly purposes, gates 52 are open at one end 58 so that the pins 57 of the sliders 55 may be inserted into gates 52 from above.

FIG. 4 shows a sectional view wherein some aspects mentioned above more clearly illustrated with the reaction vessels 1 are merely schematically shown. Conduits 60 for the temperature control medium are arranged in base 22. Vessels 1 are preferably held by the holder 29 in a suspended manner, extending into receiving sites 26 of base 22 preferably without touching the bottom 62 thereof. Seal 36 is pinched between slider gate plate 37 and the upper rim 18 of the reaction vessels 1 whereby the collars 15 of the vessels 1 are pressed down in the depressions 33.

The exit openings 16 of discharge channels 5 and the open upper ends 17 of reaction chamber spaces 3 are accessible through holes 40 respectively 39 in seal 36 and holes 43 respectively 42 in slider plate 37. Depending on the position of the sliders 55) holes 42, 43 are accessible from the exterior through holes 64 respectively 65 (see slider 66 on the left), or closed altogether by the slider (see slider 67 on the right) as explained more in detail below.

Figure 3:
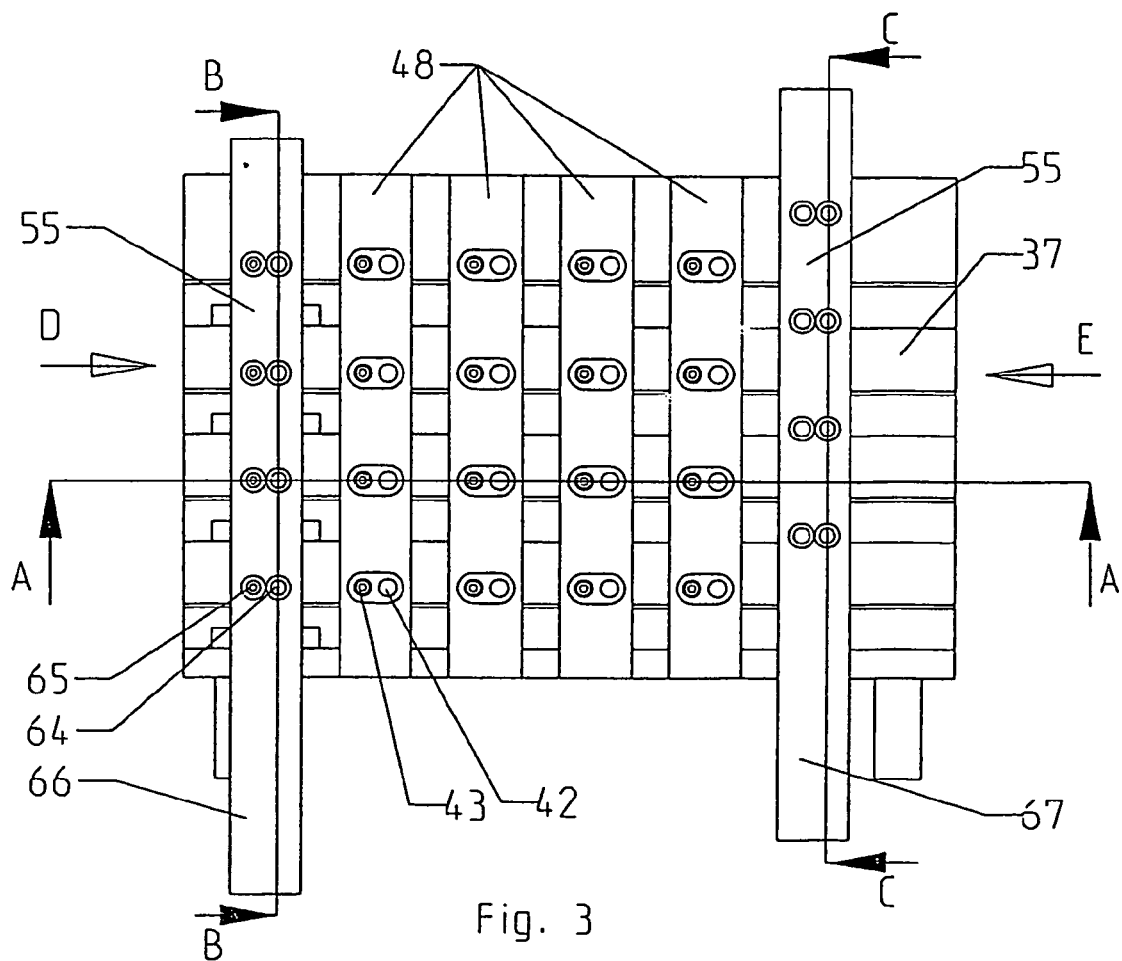
FIG. 3 shows a top view of the reactor block in FIG. 2.

FIG. 3 shows a top view of reactor block 21 and in particular of slider gate plate 37. For the sake of simplicity, four slider slots 48 in the middle are shown without sliders. Slider 66 on the left side is in open position allowing access to the reactor vessels located below by registering its holes 64, 65 with the holes 42, 43 in slider gate plate 37. Slider 67 on the right side is in closed position, i.e. a position at which the reaction vessels located below are substantially hermetically sealed, e.g. for performing the reactions.

Figure 5:
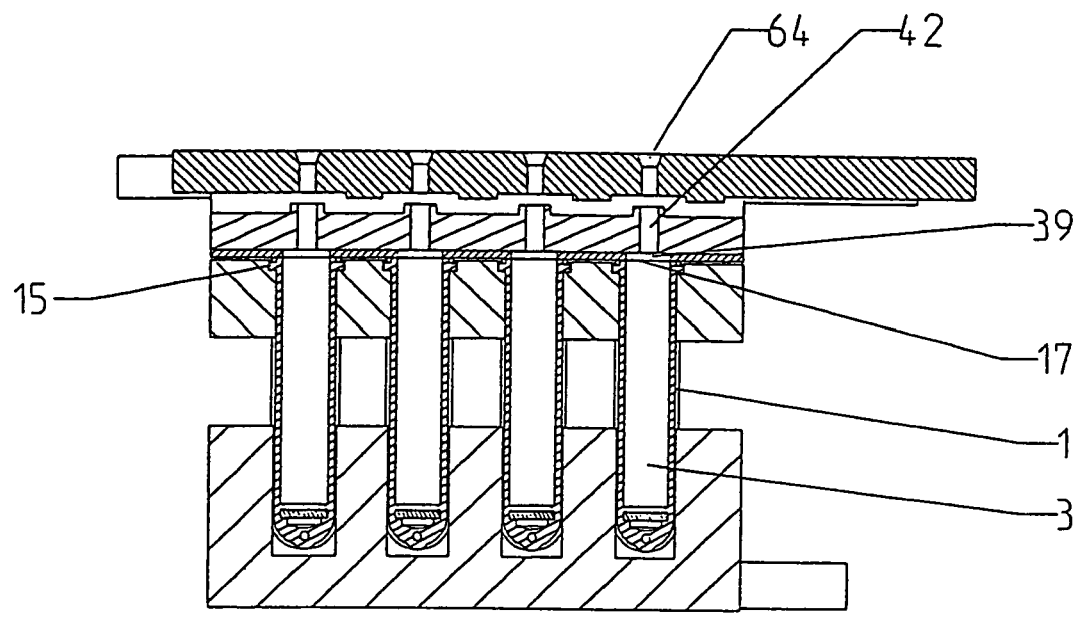
FIG. 5 shows a cross-sectional view along line B-B in FIG. 3.
Figure 6:
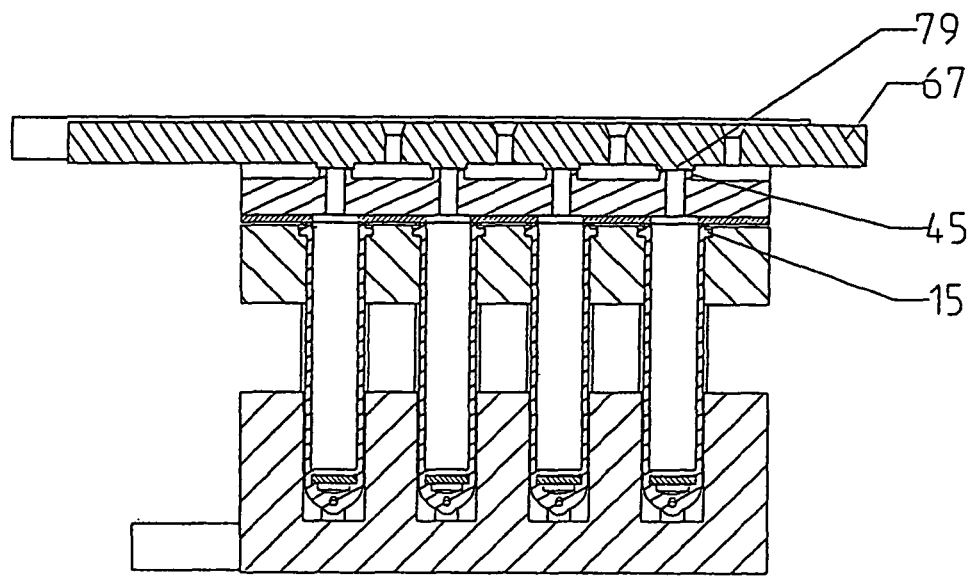
FIG. 6 shows a cross-sectional view along line C-C in FIG. 3.

As shown in FIGS. 5 and 6, slider 66 is not only moved along guiding slot 48, but abides in a slightly elevated position due to the pins 57 resting on the front surface part 70 of the gates 52. At the same time, in abutting against the front wall 72, the movement of the slider 66 is stopped in the opened position. The holes 64, 65 are aligned, and e.g. by means of a syringe, a medium can be injected into the reaction vessel through holes 64, 42, 39 and the open end 17 of the reaction chamber space 3, or withdrawn (not shown) through the holes 65, 43, 40 and the exit opening 16 of the discharge channel 5 (see FIG. 4).

In a preferred embodiment, reaction to be removed from reaction chamber space 3 of vessel 1 is removed by applying a pressure below ambient or vacuum to the exit opening 16 of discharge channel 5. For this purpose, discharge channel 5 has an upper portion which ends at exit opening 16 and which has a cross-section which is slightly larger than the cross-section of the lower portion of discharge channel and preferably vacuum is applied by means of a needle of a syringe which has a diameter equal or slightly bigger than the diameter of an lower portion of discharge channel 5. When the front end of the syringe needle is inserted into the upper part of discharge channel 5, a substantially tight seal is established between the needle tip and the wall of the discharge channel 5. For this purpose, the upper portion of discharge channel 5 has preferably a conical part which narrows into the lower portion of discharge channel 5.

In another preferred embodiment, the transition between the lower and the upper part of discharge channel 5 is a single step. In this case a needle or a tube having a transversely cut end is used and this cut end forms a seal when pressed against the step.

Holes 43 and 65 (and 42 and 64) preferably have diameters larger than the conducting means (tube, syringe needle) used to inject or withdraw reaction medium in order to permit a free passage of the conducting means.

Figure 7:
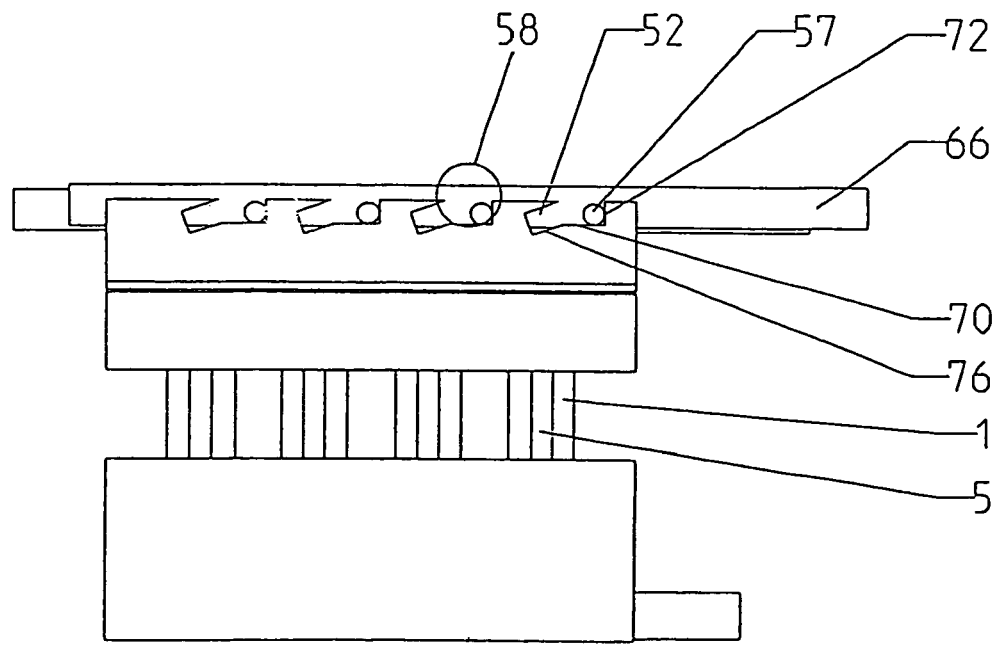
FIG. 7 shows a side view of the reactor block, showing the locking mechanism in opened position, according to arrow D in FIG. 3.
Figure 8:
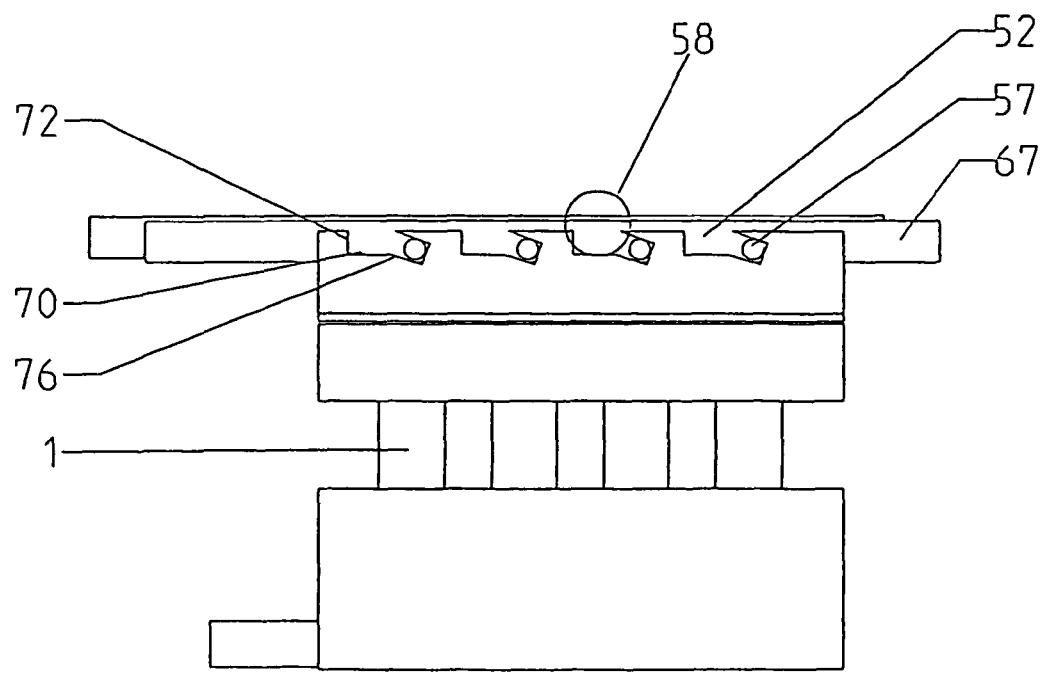
FIG. 8 shows a side view of the reactor block, showing the locking mechanism in closed position, according to arrow E in FIG. 3.

FIG. 7 shows the open configuration. FIG. 8 shows the closed configuration. As can be appreciated from these figures, during movement of slider 67 to the rear position the pins 57 are forced to move downward along the rear part 76 of gates 52, and therefore the slider 67 as well. Thereby, the end phase of the longitudinal rearward movement of sliders 55 in guiding slots 48 is transformed in a movement towards the reaction vessels 1, and, resulting in a force pressing the lower surface 79 of sliders 55 (exemplarily, slider 67) against the collars 45.

An advantage of the arrangement of the sliders 56 of the invention just described is that a simple, e.g. pneumatic or solenoid, actuator providing a sufficient powerful, yet only linear movement, may be used for moving the sliders between the open and the closed position. This arrangement even facilitates moving of these sliders by hand.

As this closing movement of the sliders 55 requires still a minimal lateral movement over collar 45, sliders 55 preferably have a smooth, plane sealing surface 79 in the respective parts of their lower surface. Sliders 55 are preferably entirely made of a suitable polymeric material, e.g. a fluorocarbon type. As sliders 55 may as well be produced by injection molding, preferably with a smooth finish treatment of their sealing surface 79, they may be produced at a sufficiently low price to allow their use as a single-use disposable components.

Due to the fact that sliders 55 are pressed with a rather elevated force against openings 42, 43, the technique used for performing reactions can be simplified: According to the prior art, vaporized solvent has been refluxed in the upper, cooler part of the reaction vessels. Solvent not condensed could escape by a venting provision, normally connected to an inert gas source. In contrast with the prior art, when a reactor block according to the invention is used, the reaction vessel may be kept closed, i.e. the reaction is carried out under moderate pressure above ambient pressure. By experiment, it has been found that preferred reaction assembly including the reaction vessel 1 of the invention can withstand the pressures developed within the reaction vessel under normal reaction conditions substantially without problems.

An inert gas blanket may be provided if necessary during exchange of the reaction medium.

Within the scope of the invention a reactor block having the above-described features is used to build a parallel reaction assembly comprising reactions vessels 1 having the above described features. A preferred use of such a parallel reaction assembly is for simultaneously performing a chemical reaction in each reaction vessel in the reactor block.

From the exemplary embodiment set forth above, the one skilled in the art is able to derive numerous variants without leaving the scope of protection which is intended to be solely defined by the appended claims. Some variations that fall within the scope of the invention are e.g.:

The reaction vessels 1 may consist of other materials, like metal, ceramics, or even glass. Due to their rather simple structure, even with these materials, mass production methods are suitable for producing the vessels.

The sealing plate or foil 36 may be left out if the contact between the reaction vessel and the lower surface of the gate plate 37 provides a sufficiently tight seal.

The sliders 55 may be connected to the gate plate by another mechanism, for example using levers, for transforming the movement of the sliders into one urging the sliders 55 against the openings 39, 40, though the preferred arrangement using pins and gates has proven to be the most reliable due to its simplicity.

The number of vessels contained in a reactor block may be varied as needed. Particularly preferred are arrangements adapted to the configuration of well plates (e.g. 96 wells, 384 wells) so that by means of a robot, whole rows of the well plate contents may be transferred to the reactor's vessels with only simple movements.

The connection channel 14 may have its sampler orifice close to the discharge channel if the molding core used to form connection channel 14 is to be retracted through the discharge channel. The connection channel may also have a constant cross-section over its length or may have its narrowest cross-section between its two end orifices and the mold used to form the connection channel may in principle be retractable through either the reaction chamber or the discharge channel or both the reaction chamber and the discharge channel.

The collar 45 may be omitted. Preferably, then, the sealing surfaces are slightly elevated with respect to the surrounding lower surface of the sliders 55 in order to concentrate the closing pressure to the holes 43, 42.

The preferred arrangement of one pair of pins 57 per vessel which helps to secure a substantially tight seal may be varied in using more or less pins and gates. Particularly if less pins are provided, and the sliders are somewhat flexible, additional measures have to be applied for securing a substantially tight seal. These additional measures may be a rigid back, for instance formed from metal or some other substantially rigid material.

For particular applications the hollow interior parts of the reaction vessel 1 may have other cross sections than circular, e.g. tetragonal, hexagonal or elliptic while still being within the scope of the present invention.

Although depression 33 for receiving the collars 15 of the reaction vessels is preferred, collars 15 may also be applied flat to the surface of the vessel holder plate 29 comprising the locations 31.

Reaction vessel 1 of the invention is usable in other applications, where exchange of a reaction chamber's contents by vacuum assisted withdrawal is needed. This includes individually performing reactions in a single reaction vessel.

Instead of a pressure equalizing channel or groove 19, other means for equalizing the pressure may be provided and are considered within the scope of the invention, e.g. a hole that communicates the reaction chamber and the discharge channel. Pressure equalizing means like channel or groove 19 may also be entirely omitted for particular applications.

What is claimed is:

1. A reaction vessel for performing chemical reactions, comprising:
    (a) a single-piece body made of a polymeric material, the body defining a reaction chamber, a connection channel, and a discharge channel, each having an interior space; said body having an outer shape that corresponds to the inner shape of a corresponding cavity of a reaction block, said body being thereby adapted to be inserted into said cavity;
    (b) the reaction chamber and the discharge channel each having an upper end with an opening therein;
    (c) the reaction chamber and the discharge channel each having a bottom portion with an orifice therein;
    (d) the reaction chamber and the discharge channel each tapering from the open upper end toward the bottom portion with decreasing cross-sectional area; and
    (e) the connection channel extending from the orifice of the bottom portion of the reaction chamber to the orifice of the bottom portion of the discharge channel and thereby fluidically connecting the interior space of the discharge channel with the interior space of the reaction chamber, said connection channel having a circular cross-section which decreases in diameter from the orifice of the bottom portion of the reaction chamber to the orifice of the bottom portion of the discharge channel,
        wherein the opening at the upper end of the reaction chamber and the opening at the upper end of the discharge channel are interconnected by a channel, hole or groove which fluidically connects the interior of the reaction chamber with the interior of the discharge channel.

2. A reaction vessel according to claim 1, wherein the reaction chamber space has a mean cross-sectional area between about 10 to about 1000 square millimeters.

3. A reaction vessel according to claim 2, wherein the reaction chamber has a mean cross-sectional area in a range between about 75 to about 120 square millimeters.

4. A reaction vessel according to claim 3, wherein the discharge channel has a cross-sectional area between about 0.8 to about 25 square millimeters.

5. A reaction vessel according to claim 2, wherein the vessel has a length between about 20 to about 200 millimeters.

6. A reaction vessel according to claim 1 further comprising filtering means near the bottom portion of the reaction chamber, so that a reaction medium contained within the reaction chamber can be withdrawn from the reaction chamber into the discharge channel through the filtering means.

7. A reaction vessel according to claim 6, wherein said filtering means is a filtration material.

8. A reaction vessel according to claim 6, wherein the filtering means is placed in a seat provided in the wall of the reaction vessel, said seat being located at the level of said orifice of the bottom portion of the reaction chamber.

9. A reaction vessel according to claim 1, wherein the reaction chamber has a longitudinal axis and the discharge channel extends substantially parallel to the longitudinal axis of the reaction chamber.

10. A reaction vessel according to claim 1, wherein said reaction chamber space is defined by a lateral wall having an outside surface and the discharge channel extends either substantially within said lateral wall or along the outside surface of the wall.

11. A reaction vessel according to claim 1, wherein said body is formed from a material selected from the group consisting of polypropylene and a fluorinated polymer.

12. A reaction vessel according to claim 1, wherein the reaction chamber has an upper open end defining an upper rim and the discharge channel has an upper open end located at the upper rim of the reaction vessel, said upper open end of said reaction chamber and said upper open end of said discharge channel being located at said upper rim.

13. An apparatus for conducting at least two chemical reactions in reaction vessels, wherein the apparatus has at least two reaction vessels each of which comprises:
(a) a single-piece body made of a polymeric material, the body defining a reaction chamber, a connection channel, and a discharge channel, each having an interior space; said body having an outer shape that corresponds to the inner shape of a corresponding cavity of a reaction block, said body being thereby adapted to be inserted into said cavity;
(b) the reaction chamber and the discharge channel each having an upper end with an opening therein;
(c) the reaction chamber and the discharge channel each having a bottom portion with an orifice therein;
(d) the reaction chamber and the discharge channel each tapering from the open upper end toward the bottom portion with decreasing cross-sectional area; and
(e) the connection channel extending from the orifice of the bottom portion of the reaction chamber to the orifice of the bottom portion of the discharge channel and thereby fluidically connecting the interior space of the discharge channel with the interior space of the reaction chamber, said connection channel having a circular cross-section which decreases in diameter from the orifice of the bottom portion of the reaction chamber to the orifice of the bottom portion of the discharge channel,
wherein the opening at the upper end of the reaction chamber and the opening at the upper end of the discharge channel are interconnected by a channel, hole or groove which fluidically connects the interior of the reaction chamber with the interior of the discharge channel.

14. The apparatus of claim 13, wherein said apparatus comprises a number of reaction vessels which is an integer multiple of 24.

15. A reactor block for performing a multiplicity of chemical reactions simultaneously, comprising:
I. a vessel holder having at least two rows of at least two locations configured and dimensioned to receive a reaction vessel, wherein the reaction vessel comprises:
(a) a single-piece body made of a polymeric material, the body defining a reaction chamber a connection channel, and a discharge channel; each having an interior space, said body having an outer shape that corresponds to the inner shape of a corresponding location of said vessel holder, said body being thereby adapted to be inserted into said cavity,
(b) the reaction chamber and the discharge channel each having an upper end with an opening therein;
(c) the reaction chamber and the discharge channel each having a bottom portion with an orifice therein;
(d) the reaction chamber and the discharge channel each tapering from the open upper end toward the bottom portion with decreasing cross-section; and
(e) the connection channel extending from the orifice of the bottom portion of the reaction chamber to the orifice of the bottom portion of the discharge channel and thereby fluidically connecting the interior space of the discharge channel with the interior space of the reaction chamber; said connection channel having a circular cross-section which decreases in diameter from the orifice of the bottom portion of the reaction chamber to the orifice of the bottom portion of the discharge channel, wherein the opening at the upper end of the reaction chamber and the opening at the upper end of the discharge channel are interconnected by a channel, hole or groove, which fluidically connects the interior of the reaction chamber with the interior of the discharge channel and
II. first closure means having openings, wherein,
(a) the first closure means is movable in a sliding manner along a rectilinear path over the openings of the upper ends of the reaction chamber and discharge channel of the reaction vessels when the reaction vessels are received in the locations, and
(b) the first closure means is slidable from a first position to a second position so that in the first position when the reaction vessels are received in the locations, the openings in the first closure means allow access to the openings of the upper ends of the reaction chamber and discharge channel of each vessel, and in the second position, the openings of the upper ends of the reaction chamber and discharge channel are closed by the first closure means resting on the open upper ends of the reaction chamber and discharge channel.

16. A reactor block according to claim 15, which further comprises guide means and_wherein the first closure means are each guided in said guide means and the guide means are operably engaged with the first closure means so that the first closure means are sealingly pressed against the openings of the upper ends of the reaction chamber and discharge channel of the reaction vessels, when the first closure means are moved to the second position.

17. A reactor block according to claim 16, wherein the first closure means comprises a slider having pins perpendicular to the sliding direction and openings there through to permit access to the reaction vessels when the first closure means are in the first position, and the guide means comprise at least one pair of gates per reaction vessel location, the gates being arranged substantially adjacent to opposing sides of the respective first closure means so that a pin of the first closure means extends into each gate, so that a first surface part of the gates guide the pins in a plane substantially parallel to the openings of the upper ends of the reaction chamber and discharge channel of the reaction vessels while the first closure means is near to its first position, and a second surface part of the gates guide the pins in a direction inclined to said plane while the first closure means is near to its second position, so that when the first closure means is moved towards its second position, the first closure means is moved towards the openings of the upper ends of the reaction chamber and discharge channel of the reaction vessels for closing them.

18. A reaction vessel for performing chemical reactions, said vessel comprising:
(a) a single-piece body made of a polymeric material, shaped by injection molding using a mold and at least one core with a movable attached extension, the body defining a reaction chamber, a connection channel and a discharge channel, each having an interior space said body having an outer shape that corresponds to the inner shape of a corresponding cavity of a reaction block, said body being thereby adapted to be inserted into said cavity;
(b) the reaction chamber and the discharge channel each having an upper end with an opening therein;
(c) the reaction chamber and the discharge channel each having a bottom portion, with each bottom portion having an orifice therein;
(d) the reaction chamber and the discharge channel each tapering from the open upper end towards the bottom portion with decreasing cross-sectional area;
(e) the connection channel being formed by the movable, attached extension of the core which is extracted from the connection channel through the reaction chamber or through the discharge channel after injection molding; and
(f) the connection channel extending between the orifice of the bottom portion of the reaction chamber orifice and the orifice of the bottom portion of the discharge channel and thereby fluidically connecting the interior space of the discharge channel with the interior space of the reaction chamber, said connection channel having a circular cross-section which decreases in diameter from the orifice of the bottom portion of the reaction chamber to the orifice of the bottom portion of the discharge channel, wherein the opening at the upper end of the reaction chamber and the opening at the upper end of the discharge channel are interconnected by a channel, hole or groove which fluidically connects the interior of the reaction chamber with the interior of the discharge channel.

19. A reaction vessel according to claim 18, wherein the reaction chamber space has a mean cross-sectional area between about 10 to about 1000 square millimeters.

20. A reaction vessel according to claim 19, wherein the reaction chamber has a mean cross-sectional area in a range between about 75 to about 120 square millimeters.

21. A reaction vessel according to claim 20, wherein the discharge channel has a cross-sectional area between about 0.8 to about 25 square millimeters.

22. A reaction vessel according to claim 19, wherein the vessel has a length between about 20 to about 200 millimeters.

23. A reaction vessel according to claim 18, further comprising filtering means near the bottom portion of the reaction chamber, so that a reaction medium contained within the reaction chamber can be withdrawn from the reaction chamber into the discharge channel through the filtering means.

24. A reaction vessel according to claim 23, wherein said filtering means is a filtration material.

25. A reaction vessel according to claim 23, wherein the filtering means is placed in a seat provided in the wall of the reaction vessel, said seat being located at the level of said orifice of the bottom portion of the reaction chamber.

26. A reaction vessel according to claim 18, wherein the reaction chamber has a longitudinal axis and the discharge channel extends substantially parallel to the longitudinal axis of the reaction chamber.

27. A reaction vessel according to claim 18, wherein said reaction chamber space is defined by a lateral wall having an outside surface and the discharge channel extends either substantially within said lateral wall or along the outside surface of the wall.

28. A reaction vessel according to claim 18, wherein said body is formed from a material selected from the group consisting of polypropylene and a fluorinated polymer.

29. A reaction vessel according to claim 18, wherein the reaction chamber has an upper open end defining an upper rim and the discharge channel has an upper open end located at the upper rim of the reaction vessel, said upper open end of said reaction chamber and said upper open end of said discharge channel being located at said upper rim.

30. An apparatus for conducting at least two chemical reactions in reaction vessels, wherein the apparatus has at least two reaction vessels, each reaction vessel comprising:
(a) a single-piece body made of a polymeric material, shaped by injection molding using a mold and at least one core with a movable attached extension, the body defining a reaction chamber, a connection channel and a discharge channel, each having an interior space said body having an outer shape that corresponds to the inner shape of a corresponding cavity of a reaction block, said body being thereby adapted to be inserted into said cavity;
(b) the reaction chamber and the discharge channel each having an upper end with an opening therein;
(c) the reaction chamber and the discharge channel each having a bottom portion, with each bottom portion having an orifice therein;
(d) the reaction chamber and the discharge channel each tapering from the open upper end towards the bottom portion with decreasing cross-sectional area;
(e) the connection channel being formed by the movable, attached extension of the core which is extracted from the connection channel through the reaction chamber or through the discharge channel after injection molding; and
(f) the connection channel extending between the orifice of the bottom portion of the reaction chamber orifice and the orifice of the bottom portion of the discharge channel and thereby fluidically connecting the interior space of the discharge channel with the interior space of the reaction chamber, said connection channel having a circular cross-section which decreases in diameter from the orifice of the bottom portion of the reaction chamber to the orifice of the bottom portion of the discharge channel, wherein the opening at the upper end of the reaction chamber and the opening at the upper end of the discharge channel are interconnected by a channel, hole or groove which fluidically connects the interior of the reaction chamber with the interior of the discharge channel.

31. The apparatus of claim 30, wherein said apparatus comprises a number of reaction vessels which is an integer multiple of 24.

32. A reactor block for performing a multiplicity of chemical reactions simultaneously comprising:
I. a vessel holder having at least two rows of at least two locations configured and dimensioned to receive a reaction vessel, wherein the reaction vessel is able to be placed into said location and comprises:
(a) a single-piece body made of a polymeric material, shaped by injection molding using a mold and at least one core with a movable attached extension, the body defining a reaction chamber having an interior space, a connection channel and a discharge channel said body having an outer shape that corresponds to the inner shape of a corresponding cavity of a reaction block, said body being thereby adapted to be inserted into said cavity;

(b) the reaction chamber and the discharge channel each having an upper end with an opening therein;

(c) the reaction chamber and the discharge channel each having a bottom portion, with each bottom portion having an orifice therein;

(d) the reaction chamber and the discharge channel each tapering from the open upper end towards the bottom portion with decreasing cross-section;

(e) the connection channel being formed by the movable, attached extension of the core which is extracted from the connection channel through the reaction chamber or through the discharge channel after injection molding; and (f) the connection channel extending between the orifice of the bottom portion of the reaction chamber orifice and the orifice of the bottom portion of the discharge channel and thereby fluidically connecting the interior space of the discharge channel with the interior space of the reaction chamber; said connection channel having a circular cross-section which decreases in diameter from the orifice of the bottom portion of the reaction chamber to the orifice of the bottom portion of the discharge channel, wherein the opening at the upper end of the reaction chamber and the opening at the upper end of the discharge channel are interconnected by a channel, hole or groove which fluidically connects the interior of the reaction chamber with the interior of the discharge channel, and II. first closure means having openings, wherein, (a) the first closure means is movable in a sliding manner along a rectilinear path over the openings of the upper ends of the reaction chamber and discharge channel of the reaction vessels when the reaction vessels are received in the locations, and (b) the first closure means is slidable from a first position to a second position so that in the first position when the reaction vessels are received in the locations, the openings in the first closure means allow access to the openings of the upper ends of the reaction chamber and discharge channel of each vessel, and in the second position, the openings of the upper ends of the reaction chamber and discharge channel are closed by the first closure means resting on the open upper ends of the reaction chamber and discharge channel.

33. A reactor block according to claim 32, which further comprises guide means and_wherein the first closure means are each guided in said guide means and the guide means are operably engaged with the first closure means so that the first closure means are sealingly pressed against the openings of the upper ends of the reaction chamber and discharge channel of the reaction vessels, when the closure means are moved to the second position.

34. A reactor block according to claim 33, wherein the first closure means comprises a slider having pins perpendicular to the sliding direction and openings therethrough to permit access to the reaction vessels when the first closure means are in the first position, and the guide means comprise at least one pair of gates per reaction vessel location, the gates being arranged substantially adjacent to opposing sides of the respective first closure means so that a pin of the first closure means extends into each gate, so that a first surface part of the gates guide the pins in a plane substantially parallel to the openings of the upper ends of the reaction chamber and discharge channel of the reaction vessels while the first closure means is near to its first position, and a second surface part of the gates guide the pins in a direction inclined to said plane while the first closure means is near to its second position, so that when the first closure means is moved towards its second position, the first closure means is moved towards the openings of the upper ends of the reaction chamber and discharge channel of the reaction vessels for closing them.

* * * * *